US010267434B2

(12) United States Patent
Mitsu et al.

(10) Patent No.: US 10,267,434 B2
(45) Date of Patent: Apr. 23, 2019

(54) MOTOR-OPERATED VALVE

(71) Applicant: PACIFIC INDUSTRIAL CO., LTD., Ogaki-shi, Gifu-ken (JP)

(72) Inventors: Terumasa Mitsu, Motosu (JP); Osamu Takami, Ogaki (JP)

(73) Assignee: PACIFIC INDUSTRIAL CO., LTD., Ogaki-shi (JP)

(*) Notice: Subject to any disclaimer, the term of this patent is extended or adjusted under 35 U.S.C. 154(b) by 0 days.

(21) Appl. No.: 15/510,767

(22) PCT Filed: Aug. 4, 2016

(86) PCT No.: PCT/JP2016/072960
§ 371 (c)(1),
(2) Date: Mar. 13, 2017

(87) PCT Pub. No.: WO2018/025373
PCT Pub. Date: Feb. 8, 2018

(65) Prior Publication Data
US 2018/0038512 A1 Feb. 8, 2018

(51) Int. Cl.
*F16K 31/04* (2006.01)
*F16K 47/04* (2006.01)
*F16K 1/12* (2006.01)
(Continued)

(52) U.S. Cl.
CPC .............. *F16K 47/04* (2013.01); *F16K 1/123* (2013.01); *F16K 31/04* (2013.01); *F16K 31/508* (2013.01);
(Continued)

(58) Field of Classification Search
CPC .......... F16K 31/04; F16K 31/047; F16K 1/50; F16K 47/00; F16K 47/04; F16K 31/508;
(Continued)

(56) References Cited

U.S. PATENT DOCUMENTS 7,025,329 B2 *  4/2006  Winter ...................... F16K 1/38
                                                       251/129.11
7,165,755 B2 *  1/2007  Umezawa ............. F16K 31/047
                                                       251/129.11
(Continued)

FOREIGN PATENT DOCUMENTS

CN          1297518 A       5/2001
CN          1942695 A       4/2007
(Continued)

OTHER PUBLICATIONS

Oct. 18, 2016 Search Report issued in International Patent Application No. PCT/JP2016/072960.
(Continued)

*Primary Examiner* — Ian Paquette
(74) *Attorney, Agent, or Firm* — Oliff PLC

(57) ABSTRACT

A motor-operated valve includes a motor, a linear-motion shaft which receives power of the motor and is linearly moved and which includes a valve member that opens and closes a valve port formed at an end of a valve body, and an elastic member which is provided in the valve body and which contacts with an outer circumferential surface of the linear-motion shaft and regulates the lateral movement of the linear-motion shaft.

4 Claims, 10 Drawing Sheets

(51) Int. Cl.
  *F16K 31/50* (2006.01)
  *F16K 47/00* (2006.01)
  *F25B 41/06* (2006.01)
(52) U.S. Cl.
  CPC ............ *F16K 47/00* (2013.01); *F25B 41/062* (2013.01); *F25B 2341/0653* (2013.01); *F25B 2500/13* (2013.01)
(58) Field of Classification Search
  CPC .... F16K 1/123; F25B 41/062; F25B 2500/13; F25B 2341/0653
  USPC .......................... 251/129.11, 129.12, 129.13
  See application file for complete search history.

(56) References Cited

U.S. PATENT DOCUMENTS

| | | | | |
|---|---|---|---|---|
| 7,871,059 | B2 * | 1/2011 | Nalini | ................... F16K 31/047 251/129.11 |
| 9,657,656 | B2 * | 5/2017 | Weldon | ................ F02D 31/003 |
| 9,765,900 | B2 * | 9/2017 | Arai | ...................... F25B 41/062 |

FOREIGN PATENT DOCUMENTS

| | | |
|---|---|---|
| CN | 1053868678 A | 3/2016 |
| CN | 106257116 A | 12/2016 |
| JP | S64-00331 A | 1/1989 |
| JP | H10-169821 A | 6/1998 |
| JP | 2000-120883 A | 4/2000 |
| JP | 2003-148643 A | 5/2003 |
| JP | 2006-10004 A | 1/2006 |
| JP | 3825569 B2 | 9/2006 |
| JP | 2008-232276 A | 10/2008 |
| JP | 4263426 B2 | 5/2009 |
| JP | 2016-65595 A | 4/2016 |

OTHER PUBLICATIONS

Oct. 18, 2016 Written Opinion issued in International Patent Application No. PCT/JP2016/072960.

Feb. 1, 2019 Office Action issued in Chinese Patent Application No. 201680002818.4.

* cited by examiner

MOTOR-OPERATED VALVE

TECHNICAL FIELD

The present invention relates to a motor-operated valve which includes a motor as a drive source.

BACKGROUND ART

As a conventional motor-operated valve, a motor-operated valve is known in which a linear-motion shaft having a valve member at a tip end is driven by a motor (for example, see patent literature 1).

RELATED ART DOCUMENTS

Patent Documents

Patent Document 1: Japanese Published Patent Application Publication No. H10-169821 (paragraph [0007] and FIG. 1)

SUMMARY OF THE INVENTION

Problems to be Solved by the Invention

Disadvantageously, in the conventional motor-operated valve described above, the linear-motion shaft rattles relative to a stator, and thus a vibration sound is produced.

The present invention is made in view of the foregoing circumstances, and has an object to provide a motor-operated valve which can reduce a vibration sound.

Means of Solving the Problems

In order to achieve the above object, a motor-operated valve according to the present invention includes a motor, a linear-motion shaft which receives power of the motor and is linearly moved and which includes a valve member that opens and closes a valve port formed at an end of a valve body, and an elastic member which is provided in the valve body and which contacts with the outer circumferential surface of the linear-motion shaft and regulates the movement of the linear-motion shaft in a radial direction.

MODE FOR CARRYING OUT THE INVENTION

First Embodiment

Figure 1:
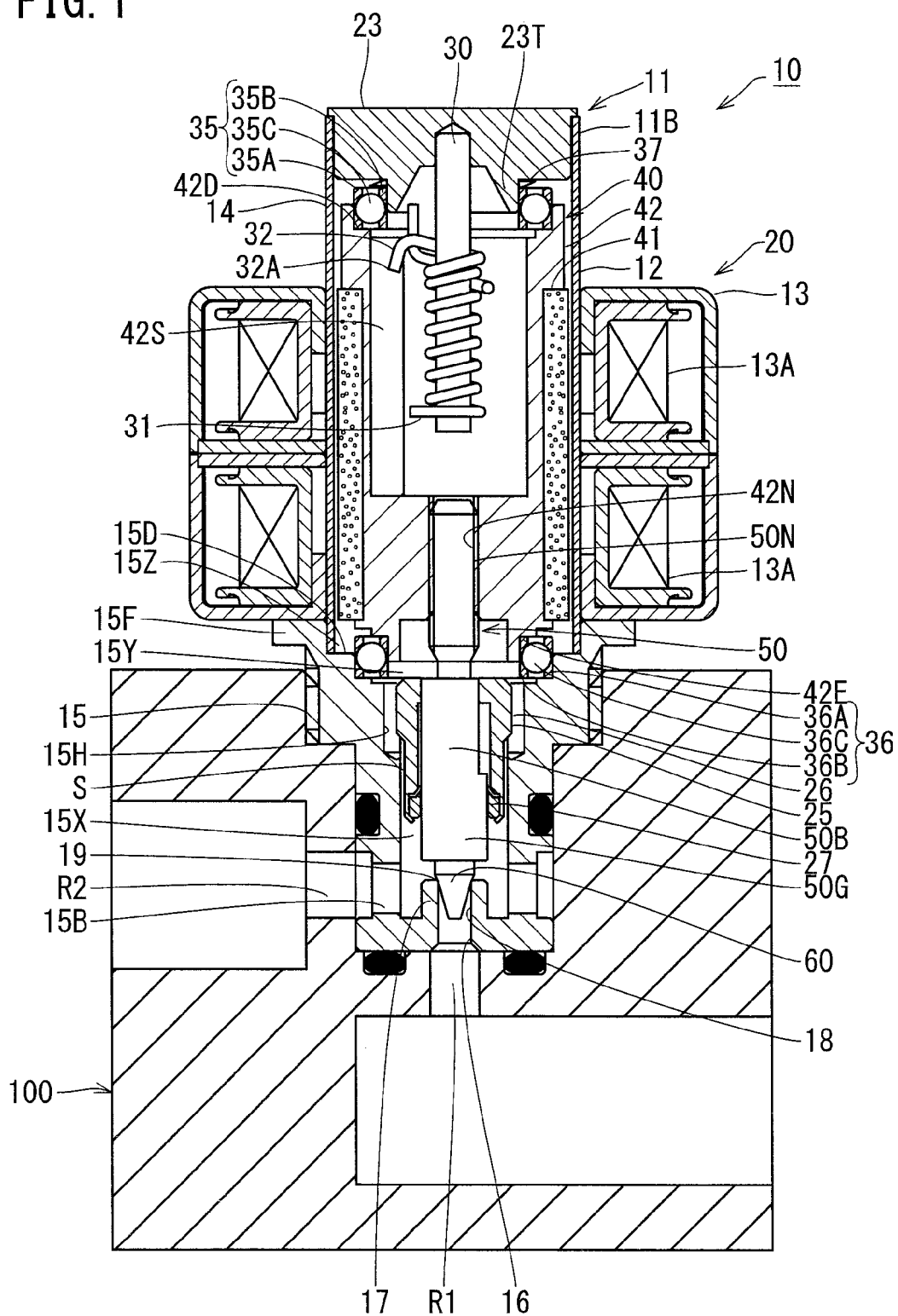
FIG. 1 is a side cross-sectional view of a motor-operated valve according to a first embodiment of the present invention.

The first embodiment of the present invention will be described below with reference to FIGS. 1 to 6. As shown in FIG. 1, a motor-operated valve 10 of the present embodiment includes a stator 11, a rotor 40 which is rotatably accommodated inside the stator 11 and a linear-motion shaft 50 which is linearly moved inside the stator 11 by the rotation of the rotor 40.

The stator 11 is formed by fixing a stator-side field portion 13 to the outside of a valve body 11B. The stator-side field portion 13 is formed in the shape of an annular ring, and includes electromagnetic coils 13A aligned.

The valve body 11B includes a sleeve 12 which is extended vertically. The sleeve 12 is formed of an upper cylindrical portion 14 and a lower cylindrical portion 15, and the upper cylindrical portion 14 and the lower cylindrical portion 15 are arranged coaxially. The upper cylindrical portion 14 is formed in the shape of a cylinder which has substantially the same diameter as a whole, and an opening in its upper surface is hermetically sealed with a lid member 23. The stator-side field portion 13 described above is fixed to a lower end portion of the upper cylindrical portion 14.

As shown in FIG. 1, the lower cylindrical portion 15 includes a valve member linear-motion portion 15X which is extended from a lower end portion to an intermediate portion, a bearing receiving portion 15Y which is located above the valve member linear-motion portion 15X and which has a larger inside diameter than the valve member linear-motion portion 15X, and an upper end receiving portion 15Z which is located above the bearing receiving portion 15Y and which has a larger inside diameter than the bearing receiving portion 15Y. Among them, the lower end portion of the upper cylindrical portion 14 is fitted to the upper end receiving portion 15Z, and thus the upper cylindrical portion 14 and the lower cylindrical portion 15 are coupled to each other. The upper cylindrical portion 14 and the lower cylindrical portion 15 are welded together in a state where the lower end surface of the upper cylindrical portion 14 abuts against an annular step portion 15D which is the inner surface of the upper end receiving portion 15Z and where a flange 15F which is extended laterally from the upper end of the lower cylindrical portion 15 contacts with the lower surface of the stator-side field portion 13.

An opening portion 16 is formed in a lower end portion of the lower cylindrical portion 15, and a cylindrical portion 17 stands up from the opening edge of the opening portion 16 toward the valve member linear-motion portion 15X. The upper end opening of the cylindrical portion 17 serves as a valve port 18. In addition, in the lower cylindrical portion 15, a side opening 15B which is opened laterally is formed in a position close to the lower end. A first flow path R1 is connected to the opening portion 16, and a second flow path R2 is connected to the side opening 15B.

As shown in FIG. 1, the rotor 40 is formed by fixing a rotor-side field portion 41 having magnetic properties to the outside of a cylindrical rotary screwing cylinder 42 whose both ends are opened. The rotor-side field portion 41 and the stator-side field portion 13 are used as a main portion so as to form a stepping motor 20 which corresponds to a "motor" in the present invention, and the excitation pattern of the electromagnetic coils 13A in the stator-side field portion 13 is changed, with the result that the rotor-side field portion 41 is positioned in a predetermined rotation position.

Between the upper end portion of the rotor 40 and the lid member 23 and between the lower end portion of the rotor 40 and the lower cylindrical portion 15, bearings 35 and 36 are respectively arranged. The bearings 35 and 36 are ball bearings which respectively hold a plurality of balls 35C and 36C between outer races 35A and 36A and inner races 35B and 36B such that the balls 35C and 36C can be rolled.

In the upper bearing 35, the outer race 35A is fixed to the upper end portion of the rotary screwing cylinder 42 in the rotor 40, and the inner race 35B is fixed to the lid member 23. Specifically, in the lid member 23, a cylindrical portion 23T which is protruded downward is formed, and the inner race 35B is fitted to the outside of the cylindrical portion 23T. In the inner space of the rotary screwing cylinder 42 in the rotor 40, a step portion 42D is formed whose upper end portion is formed to increase in diameter in a stepped manner, and the outer race 35A is fitted to the step portion 42D.

In the lower bearing 36, the outer race 36A is fixed to the lower cylindrical portion 15 of the valve body 11B, and the inner race 36B is fixed to the lower end portion of the rotary screwing cylinder 42 of the rotor 40. Specifically, the outer race 36A is fitted to the bearing receiving portion 15Y of the lower cylindrical portion 15. In the outer wall of the rotary screwing cylinder 42 in the rotor 40, a step portion 42E is formed whose lower end portion is formed to decrease in diameter in a stepped manner, and the inner race 36B is fitted to the step portion 42E.

Between the lid member 23 and the inner race 35B of the upper ball bearing 35, a wave washer 37 for rattle prevention is arranged. Accordingly, the rotor 40 is rotated with respect to the stator 11 in a state where the rotor 40 is positioned in a radical direction and in an axial direction.

In addition, in the motor-operated valve 10, components which will be described below are provided in order to regulate the amount of rotation of the rotor 40. That is, as shown in FIG. 1, in the valve body 11B, a guide shaft 30 which is hung down from the lid member 23 is provided. A spiral guide 31 is fixed to the guide shaft 30. The spiral guide 31 is formed by winding wires spirally around a lower end portion of the guide shaft 30.

A stopper ring 32 is engaged with the spiral guide 31. The stopper ring 32 is formed in the shape of a ring which is held in part of a gap between the wires of the spiral guide 31 adjacent to each other in the axial direction and includes a stopper arm 32A which is extended laterally. On the inner surface of the rotary screwing cylinder 42 of the rotor 40, ring contacting portions 42S (in FIG. 1, only the ring contacting portion 42S on the back side is shown) are formed. The ring contacting portions 42S are arranged above the female screw portion 42N and are extended in the vertical direction so as to sandwich the stopper arm 32A. When the rotor 40 is rotated, the stopper ring 32 is pushed by the ring contacting portions 42S, rotated relative to the spiral guide 31, moved upward and downward, and becomes non-rotatable when moving to the upper end portion or the lower end portion of the spiral guide 31. In this way, the amount of rotation of the rotor 40 is regulated.

Figure 2:
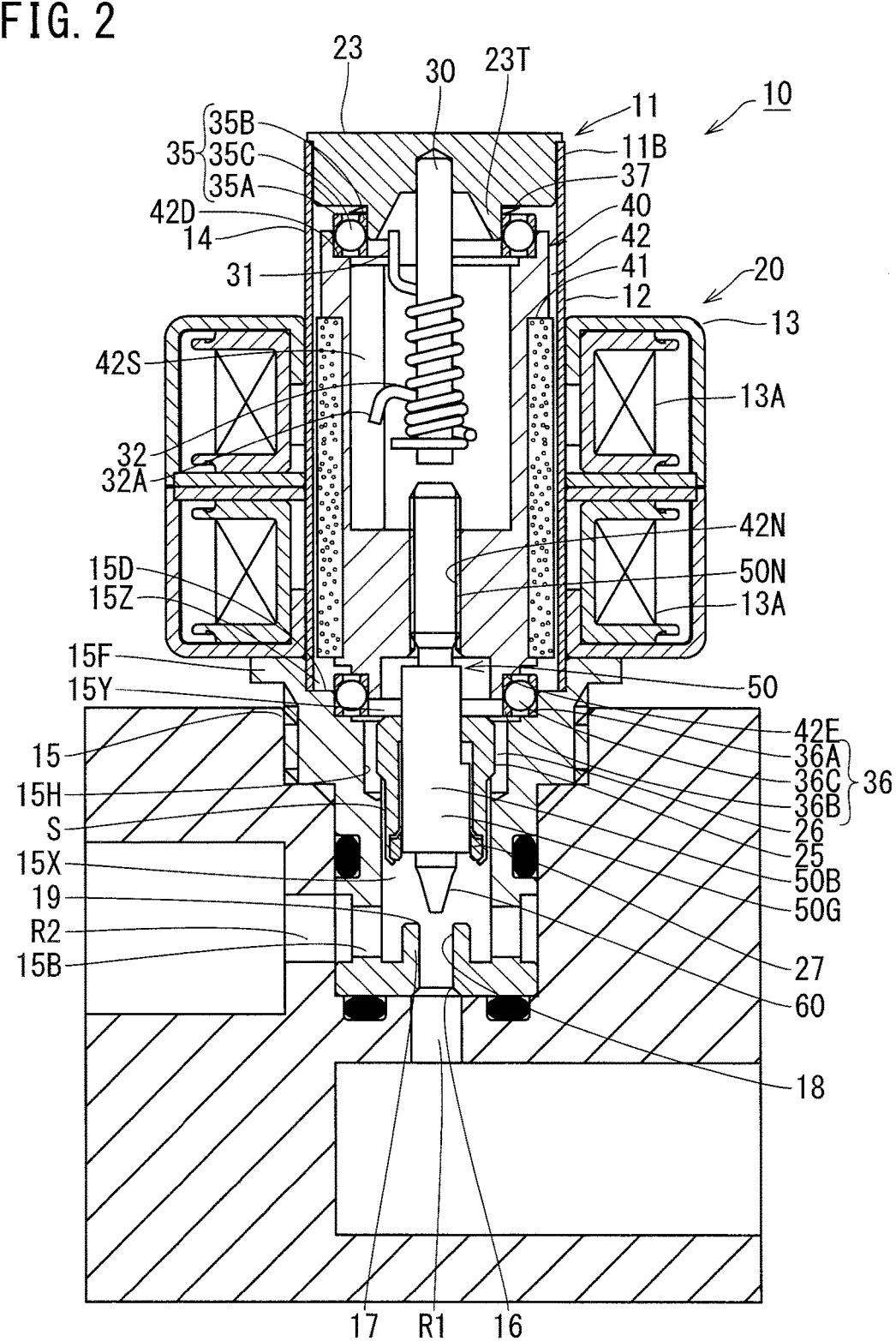
FIG. 2 is a side cross-sectional view of the motor-operated valve in a state where a valve port is open.

As shown in FIG. 1, the female screw portion 42N is formed on the inner side of the rotary screwing cylinder 42 in the rotor 40, in a position close to its lower end. The linear-motion shaft 50 is screwed to the female screw portion 42N. The linear-motion shaft 50 has, at its upper end portion, a male screw portion 50N (which corresponds to a "screw portion" in the present invention) which is screwed into the female screw portion 42N of the rotor 40 and has, at its lower end portion, a valve member 60 which opens and closes the valve port 18. The valve member 60 is formed in the shape of a truncated cone whose diameter decreases toward a tip end portion. The valve member 60 enters into the valve port 18 from above as shown in FIG. 1, comes into contact with a valve seat 19, thereby closes the valve port 18 and regulates the flow. Then, as shown in FIG. 2, the valve member 60 is moved upward, and thus the valve port 18 is opened, with the result that the flow between the first flow path R1 and the second flow path R2 becomes possible.

The linear-motion shaft 50 is supported linearly movably and unrotatably with respect to the lower cylindrical portion 15, and the linear-motion shaft 50 is linearly moved in the vertical direction by being screwed into the rotary screwing cylinder 42 in accordance with the rotation of the rotor 40. The support mechanism of the linear-motion shaft 50 will be described in detail below.

Figure 3:
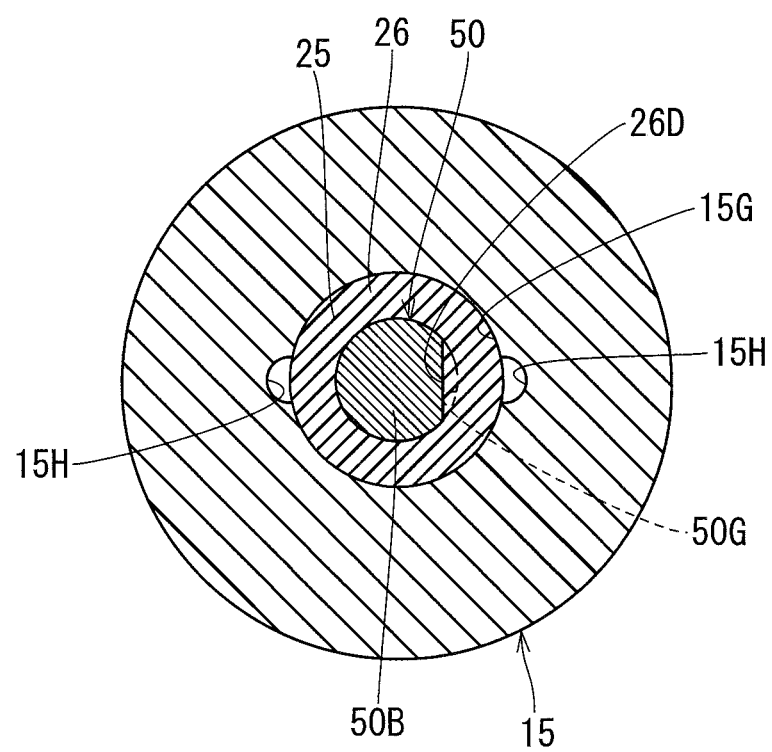
FIG. 3 is a horizontal cross-sectional view in the vicinity of a receiving cylindrical member.
Figure 4:
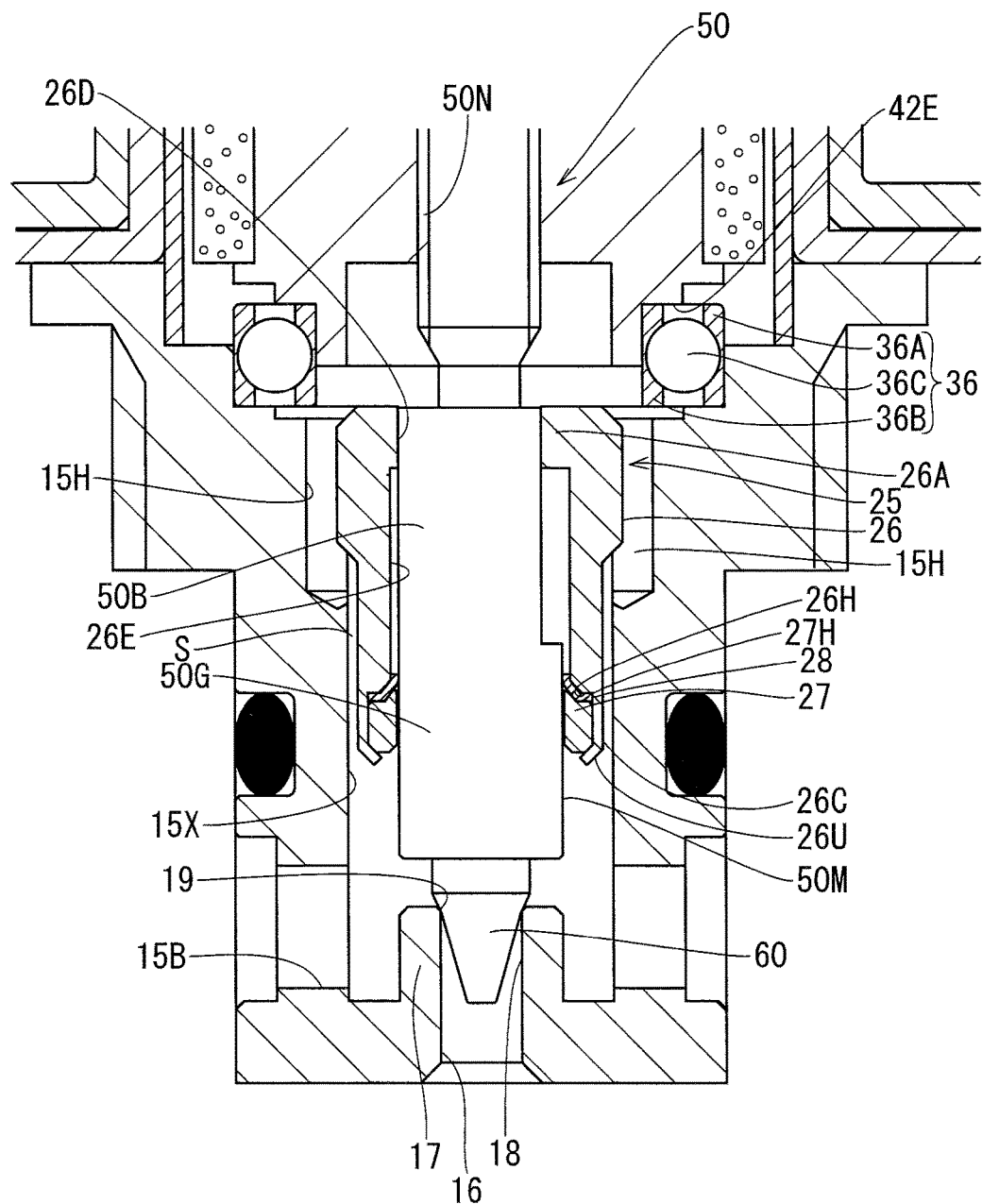
FIG. 4 is a side cross-sectional view in the vicinity of the receiving cylindrical member.

As shown in FIGS. 1 and 3, in the linear-motion shaft 50, between the male screw portion 50N and the valve member 60, a sliding shaft portion 50B (which corresponds to a "noncircular shaft portion" in the present invention) whose cross section is formed in the shape of the letter D and a circular shaft portion 50G whose cross section is circular are formed and are aligned vertically. As shown in FIG. 4, the sliding shaft portion 50B and the circular shaft portion 50G are received in a receiving cylindrical member 25 provided in the valve body 11B. The receiving cylindrical member 25 is formed at the upper end portion of the valve member linear-motion portion 15X in the lower cylindrical portion 15 and is attached to a receiving portion 15G which has a larger inside diameter than the valve member linear-motion portion 15X. In the circumferential portion of the receiving portion 15G, two communication holes 15H are formed (see FIG. 3), and furthermore, between the outer surface of the lower end portion of the receiving cylindrical member 25 and the inner surface of the lower cylindrical portion 15 (specifically, the inner surface of the valve member linear-motion portion 15X), a gap S is provided. In this way, the pressures of upper and lower spaces separated by the receiving cylindrical member 25, that is, the pressure of a portion of a space inside the valve body 11B in which the valve member 60 is moved vertically and the pressure inside the stepping motor 20 are substantially uniform.

Figure 5:
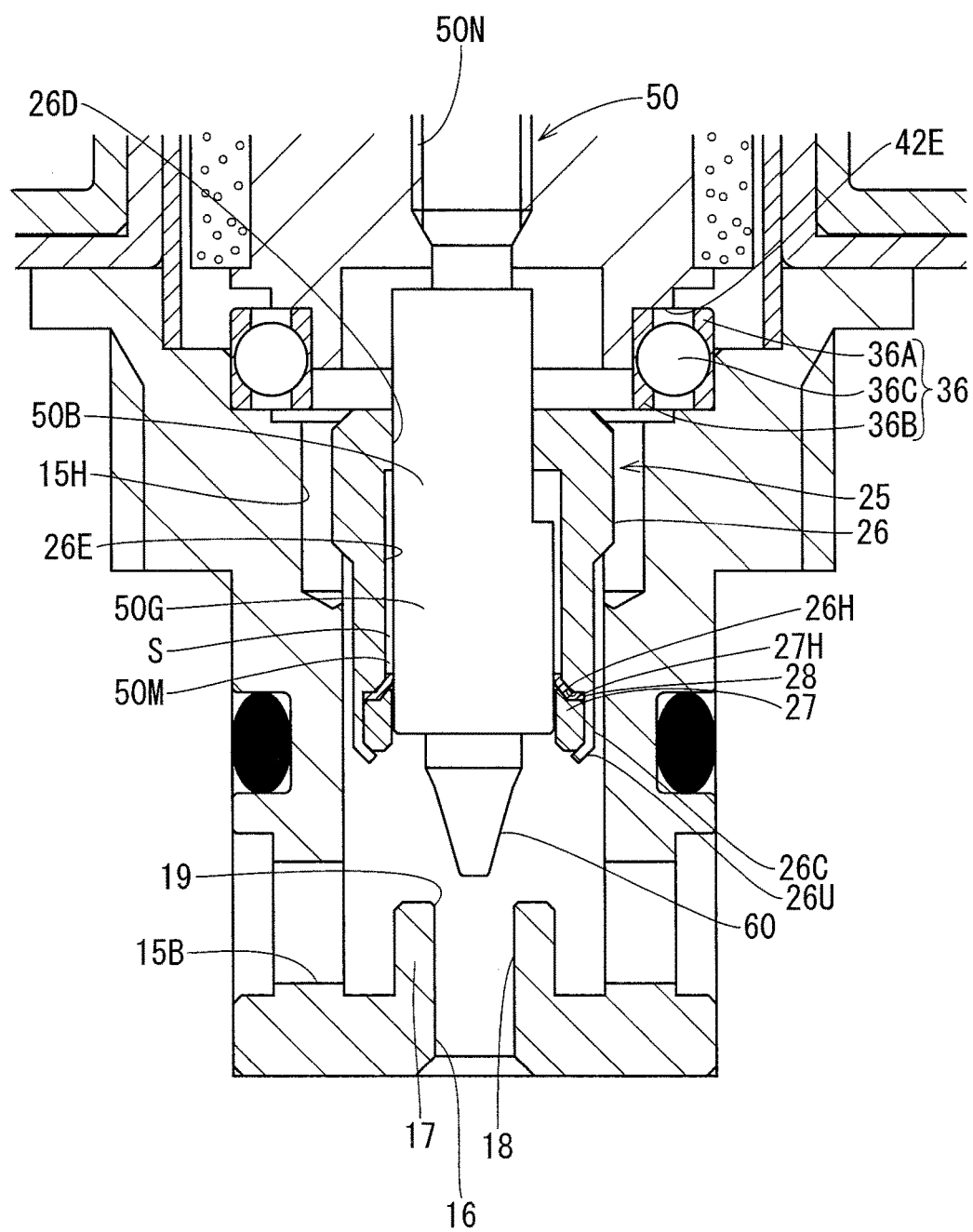
FIG. 5 is a side cross-sectional view in the vicinity of the receiving cylindrical member.

The receiving cylindrical member 25 includes a cylindrical main body portion 26 which is formed in the shape of a cylinder. In the cylindrical main body portion 26, its interior is a circular hole 26E whose cross section is circular, and its inside diameter is slightly larger than the outside diameter of the circular shaft portion 50G of the linear-motion shaft 50. At the upper end of the cylindrical main body portion 26, an extension portion 26A which is extended inward from the opening edge of the circular hole 26E is provided, and in its center, a shaft receiving hole 26D (which serves as a "noncircular hole" in the present invention) is formed correspondingly to the sliding shaft portion 50B and in the shape of the letter D. As shown in FIGS. 4 and 5, in the linear-motion range of the linear-motion shaft 50, the shaft receiving hole 26D contacts with only the sliding shaft portion 50B and thereby regulates the rotation of the linear-motion shaft 50.

Figure 6:
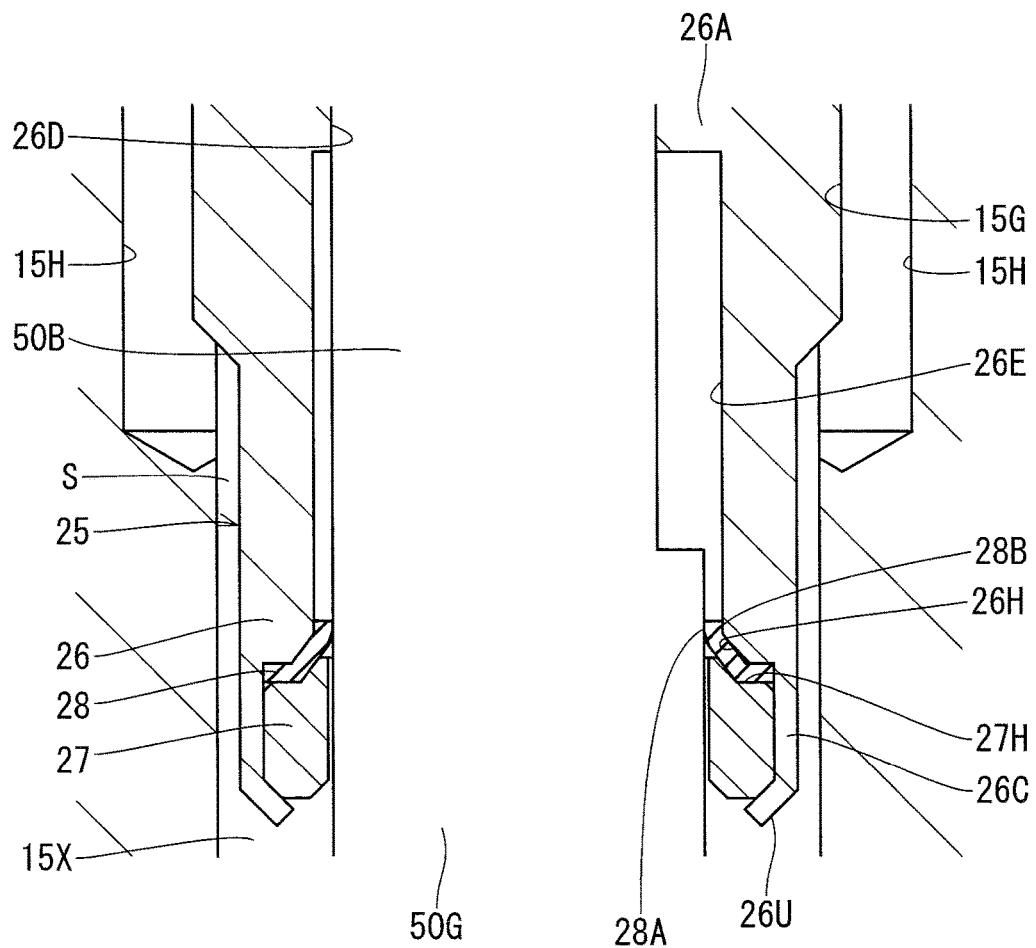
FIG. 6 is a side cross-sectional view in the vicinity of a Teflon sheet.

As shown in FIG. 6, at the lower end portion of the cylindrical main body portion 26, an annular protrusion wall 26C (which corresponds to a "protrusion wall" in the present invention) is formed which is protruded downward from an outer edge portion. In a state where a linear-motion bearing 27 is received inside the annular protrusion wall 26C, a tip end portion 26U of the annular protrusion wall 26C is swaged and bent inward, and thus the linear-motion bearing 27 is non-rotatably fixed to the cylindrical main body portion 26.

The linear-motion bearing 27 is formed in the shape of a cylinder as with the cylindrical main body portion 26, and its inside diameter is larger than the outside diameter of the circular shaft portion 50G but is smaller than the inside diameter of the circular hole 26E in the cylindrical main body portion 26. As shown in FIGS. 4 and 5, in the linear-motion range of the linear-motion shaft 50, the linear-motion bearing 27 makes sliding contact with only the circular shaft portion 50G and supports the linear motion of the linear-motion shaft 50.

Here, in the motor-operated valve 10 of the present embodiment, the receiving cylindrical member 25 is provided with a Teflon sheet 28 (which corresponds to an "elastic member" in the present invention) which contacts with an outer circumferential surface 50M of the circular shaft portion 50G in the linear-motion shaft 50.

The Teflon sheet 28 is formed in the shape of an annular plate, and its inside diameter is smaller than the outside diameter of the circular shaft portion 50G of the linear-motion shaft 50. The Teflon sheet 28 is assembled simultaneously when the linear-motion bearing 27 is assembled to the cylindrical main body portion 26, and an outer edge portion is sandwiched between the cylindrical main body portion 26 and the linear-motion bearing 27. Specifically, the Teflon sheet 28 is inserted into the cylindrical main body portion 26 from the side of the tip end portion 26U of the annular protrusion wall 26C and is sandwiched, in a state where the Teflon sheet 28 is arranged on a lower end surface 26H from which the annular protrusion wall 26C of the cylindrical main body portion 26 is protruded, between the lower end surface 26H and an upper end surface 27H of the linear-motion bearing 27. At this time, since the movement of the Teflon sheet 28 in the radial direction is regulated by the annular protrusion wall 26C, the Teflon sheet 28 is unlikely to be displaced. Both the lower end surface 26H of the cylindrical main body portion 26 and the upper end surface 27H of the linear-motion bearing 27 are tapered to be inclined upward as they are extended inward, and the inner edge portion of the Teflon sheet 28 is extended inward from the inner surface of the linear-motion bearing 27 and is inclined upward. When the linear-motion shaft 50 is inserted into the receiving cylindrical member 25 from the side of the linear-motion bearing 27, as shown in FIG. 6, the inner edge portion of a surface 28A of the Teflon sheet 28 on the side which is directed to the linear-motion bearing 27 contacts with an outer circumferential surface M of the circular shaft portion 50G in the linear-motion shaft 50 and the inner edge portion of a surface 28B on the side which is directed to the cylindrical main body portion 26 contacts with the inner surface of the circular hole 26E in the cylindrical main body portion 26. In this way, the circular shaft portion 50G of the linear-motion shaft 50 is held via the Teflon sheet 28 by the receiving cylindrical member 25.

The configuration of the present embodiment has been described above. Next, the operations and effects of the present embodiment will be described. The motor-operated valve 10 of the present embodiment is assembled to, for example, a body 100 (see FIG. 1). And, the rotor 40 is rotated by receiving the excitation of the stator-side field portion 13, thus the linear-motion shaft 50 having the valve member 60 is linearly moved by being screwed into the rotary screwing cylinder 42 of the rotor 40 and the opening degree of the valve is changed. Accordingly the flow rate of coolant flowing between the first flow path R1 and the second flow path R2 is changed.

Here, since the valve body 11B is provided with the Teflon sheet 28 which contacts with the outer circumferential surface 50M of the linear-motion shaft 50 in the motor-operated valve 10 of the present embodiment, it is possible to prevent the linear-motion shaft 50 from rattling in the radial direction, and therefore reduction of a vibration sound is enabled.

Since the bearings 35 and 36 are arranged between the stator 11 and the rotor 40, the rotor 40 is also prevented from rattling in the radial direction, with the result that it is possible to further reduce a vibration sound. Furthermore, since the rotor 40 is also positioned in the axial direction by the wave washer 37 for preventing the rattle of the bearings 35 and 36, the rotor 40 is prevented from rattling in the axial direction, with the result that it is possible to further reduce a vibration sound.

When a configuration is adopted in which the Teflon sheet 28 contacts with the sliding shaft portion 50B whose cross section is formed in the shape of the letter D in the linear-motion shaft 50, it can be considered that the Teflon sheet 28 wears out by making sliding contact with the corner of the letter D. However, in the present embodiment, the Teflon sheet 28 is configured so as to contact with the circular shaft portion 50G whose cross section is circular, and thus it is also possible to prevent the Teflon sheet 28 from wearing out.

The Teflon sheet 28 is attached to the receiving cylindrical member 25 which prevents the linear-motion shaft 50 from being rotated and which supports the linear motion thereof, and thus it is possible to reduce the number of components as compared with a configuration in which the receiving cylindrical member 25 and members for fixing the Teflon sheet 28 are individually provided. Furthermore, the Teflon sheet 28 is attached simultaneously when the linear-motion bearing 27 is attached to the cylindrical main body portion 26, and thus it is possible to reduce the operation time. Moreover, the receiving cylindrical member 25 is provided as a component separate from the lower cylindrical portion 15, and thus it can be considered that it becomes easy to assemble the motor-operated valve 10.

Other Embodiments

The present invention is not limited to the embodiment described above, and for example, embodiments which will be described below are also included in the technical scope of the present invention, and further, various variations other than those described below can be practiced without departing from the gist thereof.

Figure 7:
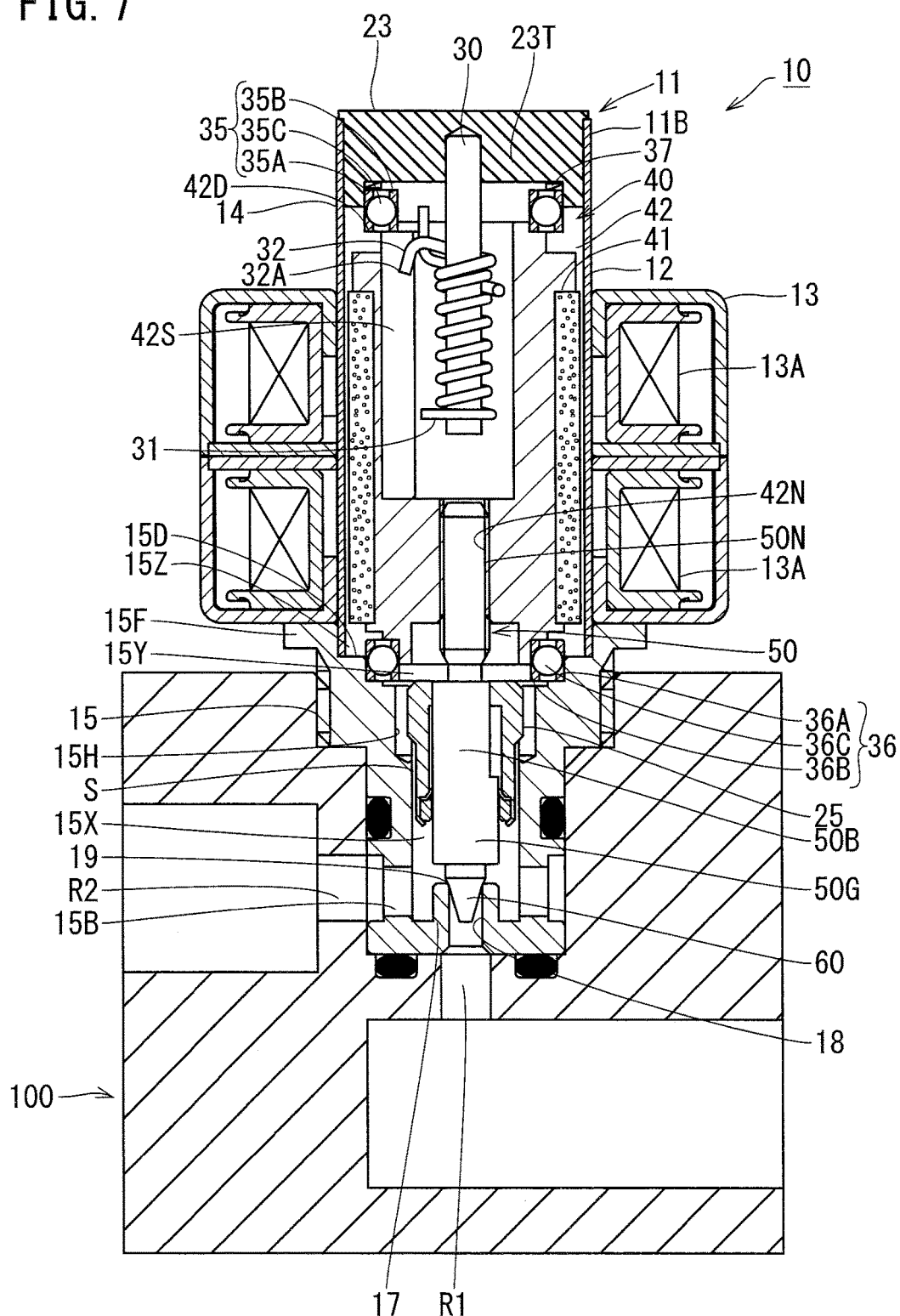
FIG. 7 is a side cross-sectional view of a motor-operated valve according to a variation.

(1) Although in the embodiment described above, the rotary screwing cylinder 42 of the rotor 40 is fixed to the outer race 35A in the upper bearing 35 and is fixed to the inner race 36B in the lower bearing 36, they may be fixed oppositely, as shown in FIG. 7, both of them may be fixed to the outer races 35A and 36A or both of them may be fixed to the inner races 35B and 36B.

Figure 8:
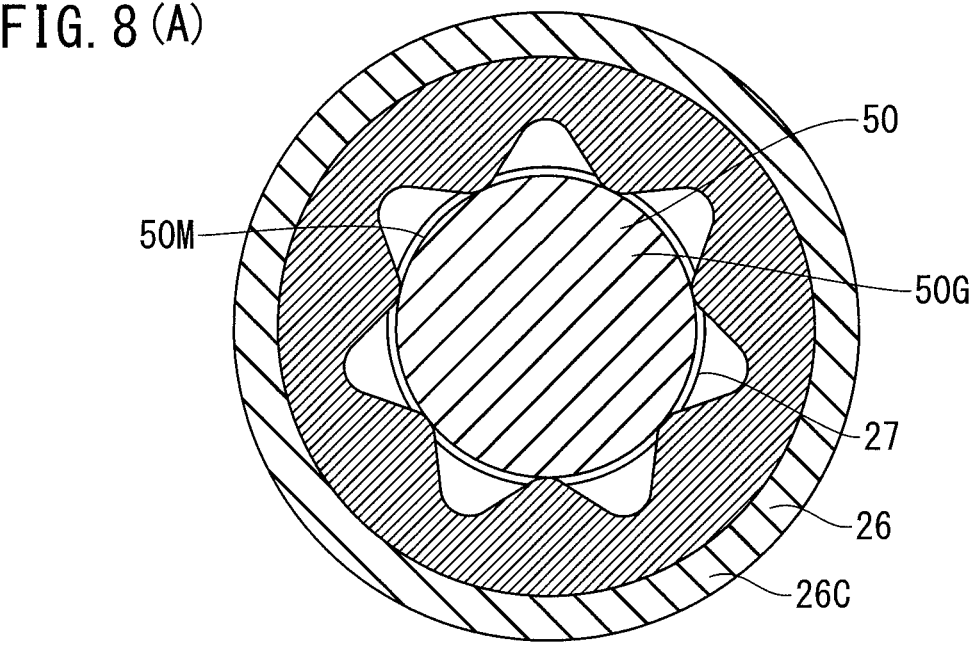
FIG. 8 is a horizontal cross-sectional view in the vicinity of an elastic member according to a variation.
Figure 8:
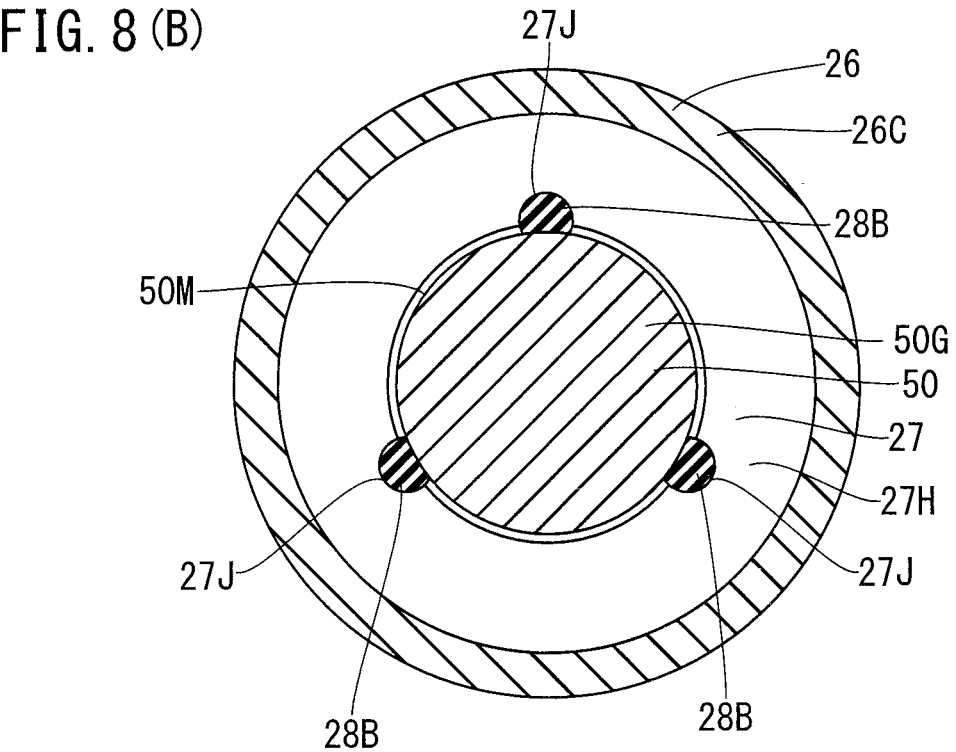

(2) Although in the embodiment described above, the Teflon sheet 28 contacts with the entire outer circumferential surface 50M of the circular shaft portion 50G in the linear-motion shaft 50, the inner edge of the Teflon sheet 28 may adopt a configuration so as to be formed in a wavy shape so as to intermittently contact against the outer circumferential surface 50M of the linear-motion shaft 50 as shown in FIG. 8(A). Also, as shown in FIG. 8(B), a configuration may be adopted in which on the opening edge of the upper end surface 27H of the linear-motion bearing 27, for example, hemispherical receiving recessed portions 27J are provided, and in which spheres 28B (which correspond to the "elastic members" in the present invention) made of an elastomer are arranged in the receiving recessed portions 27J. Although the receiving recessed portions 27J and the spheres 28B may be provided in two places, as shown in FIG. 8(B), they are preferably disposed evenly in three places in the circumferential direction of the linear-motion shaft 50. In the case of the example described above, even when the communication holes 15H and the gap S are not provided, the pressures of the upper and lower spaces separated by the receiving cylindrical member 25 are substantially uniform.

Figure 9:
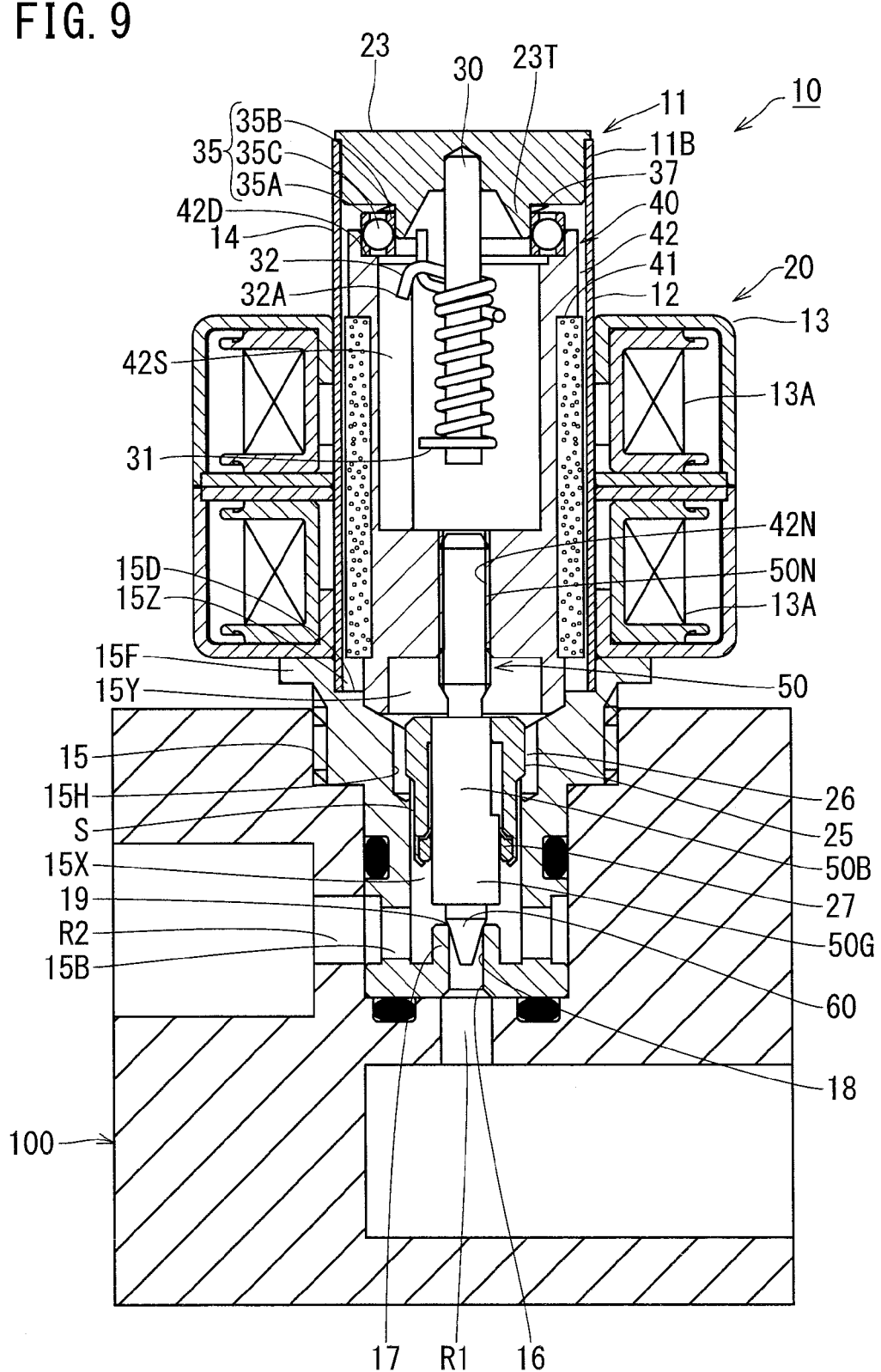
FIG. 9 is a side cross-sectional view of the motor-operated valve according to a variation.

(3) Although in the embodiment described above, the movement of the rotor 40 in the radial direction is regulated by the bearings 35 and 36, for example, as shown in FIG. 9, a configuration may be adopted in which the portions where the lower end portion of the rotor 40 and the lower cylindrical portion 15 come into contact with each other are tapered and the movement of the rotor 40 in the radial direction is regulated. Although FIG. 9 shows an example where the lower end portion of the rotor 40 and the lower cylindrical portion 15 are tapered and where the bearing 35 is provided between the upper end portion of the rotor 40 and the lid member 23, conversely, the bearing 26 may be provided between the lower end portion of the rotor 40 and the lower cylindrical portion 15 such that the upper end portion of the rotor 40 and the lid member 23 are tapered or both the lower end portion of the rotor 40 and the lower cylindrical portion 15 and the upper end portion of the rotor 40 and the lid member 23 may be tapered.

(4) Although in the embodiment described above, the valve member 60 is arranged on the side closer to the stepping motor 20 than the valve port 18 so as to come into contact with the valve port 18 from above, the valve member 60 may adopt a configuration so as to be arranged on the side opposite to the stepping motor 20 across the valve port 18 so as to come into contact with the valve port 18 from below.

(5) Although in the embodiment described above, the sliding shaft portion 50B and the circular shaft portion 50G in the linear-motion shaft 50 are arranged between the male screw portion 50N and the valve member 60, and the receiving cylindrical member 25 is arranged between the valve port 18 and the rotor 40, a configuration may be adopted in which the sliding shaft portion 50B and the circular shaft portion 50G are arranged above the male screw portion 50N and in which the receiving cylindrical member 25 is arranged above the rotor 40.

Figure 10:
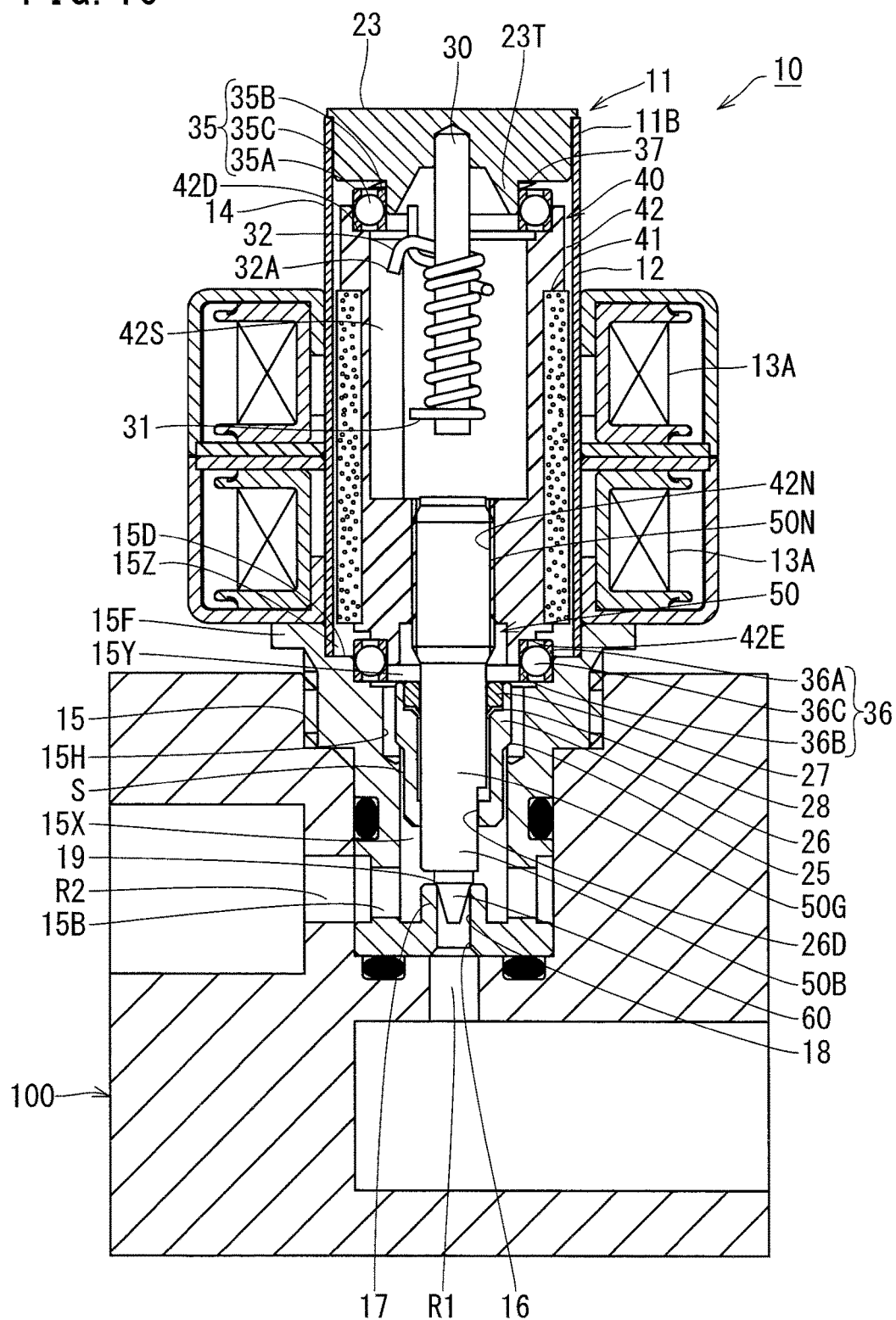
FIG. 10 is a side cross-sectional view of the motor-operated valve according to a variation.

(6) Although in the embodiment described above, in the linear-motion shaft 50, the sliding shaft portion 50B is arranged on the upper side and the circular shaft portion 50G is arranged on the lower side, they may be arranged oppositely. In other words, as shown in FIG. 10, the male screw portion 50N, the circular shaft portion 50G, the sliding shaft portion 50B and the valve member 60 may be arranged in this order from above. In this case, in the receiving cylindrical member 25, the shaft receiving hole 26D which contacts with the sliding shaft portion 50B is arranged on the lower side, and the linear-motion bearing 27 and the Teflon sheet 28 which makes sliding contact with or contacts with the circular shaft portion 50G are arranged on the upper side.

(7) Although in the embodiment described above, the Teflon sheet 28 is inclined upward as it is extended inward, the Teflon sheet 28 may adopt a configuration so as to be inclined downward as it is extended inward. The inner circumferential surface of the Teflon sheet 28 may adopt a configuration so as to contact with the outer circumferential surface 50M of the circular shaft portion 50G in the linear-motion shaft 50.

(8) Although in the embodiment described above, the tip end portion 26U of the annular protrusion wall 26C is swaged so as to be bent inward, and thus the linear-motion bearing is held in the cylindrical main body portion 26, the linear-motion bearing 27 may adopt a configuration so as to be press-fitted into the cylindrical main body portion 26.

DESCRIPTION OF THE REFERENCE NUMERAL

10 Motor-operated valve
11 Stator
11B Valve body
18 Valve port
20 Stepping motor (motor)
25 Receiving cylindrical member
26 Cylindrical main body portion
26D Shaft receiving hole (noncircular hole)
27 Linear-motion bearing
28 Teflon sheet (elastic member)
40 Rotor
50 Linear-motion shaft
50B Sliding shaft portion (noncircular shaft portion)
50G Circular shaft portion
50M Outer circumferential surface
60 Valve member

The invention claimed is:

1. A motor-operated valve comprising:
a motor;
a linear-motion shaft which receives power of the motor and is linearly moved and which includes a valve member that opens and closes a valve port formed at an end of a valve body; and
an elastic member which is provided in the valve body and which contacts with an outer circumferential surface of the linear-motion shaft and regulates a movement of the linear-motion shaft in a radial direction
a noncircular shaft portion which is provided in the linear-motion shaft, which is loosely fitted to a noncircular hole formed in the valve body so as to prevent the linear-motion shaft from being rotated and whose cross section is noncircular; and
a receiving cylindrical member which is provided in the valve body, which includes the noncircular hole and which receives the linear-motion shaft, wherein
the receiving cylindrical member includes a cylindrical main body portion which has the noncircular hole on one end side and a linear-motion bearing which is attached to the other end side of the cylindrical main body portion, and
the elastic member is formed of a sheet in a shape of an annular ring, and an outer edge portion thereof is sandwiched between the cylindrical main body portion and the linear-motion bearing.

2. The motor-operated valve according to claim 1, comprising:
a protrusion wall which is protruded from an outer circumferential edge of the other end side of the cylindrical main body portion and which non-rotatably holds the linear-motion bearing therewithin.

3. The motor-operated valve according to claim 1, comprising:

a rotor of the motor which is rotated with respect to the valve body in a state where the rotor is positioned in a direction of a rotation axis and which is screwed into the linear-motion shaft; and
a circular shaft portion which is provided in the linear-motion shaft and whose cross section is circular,
wherein the linear-motion shaft is linearly moved only in a range in which the elastic member contacts with the circular shaft portion.

4. The motor-operated valve according to claim 3,
wherein the noncircular shaft portion and the circular shaft portion are arranged so as to be aligned between the valve member and a screw portion screwed into the rotor in the linear-motion shaft,
the receiving cylindrical member is arranged between the valve port and the rotor in the valve body, and
the elastic member is attached to the receiving cylindrical member.

\* \* \* \* \*